No. 734,377. PATENTED JULY 21, 1903.
F. TOERGE.
HOSE COUPLING.
APPLICATION FILED MAR. 3, 1903.
NO MODEL.
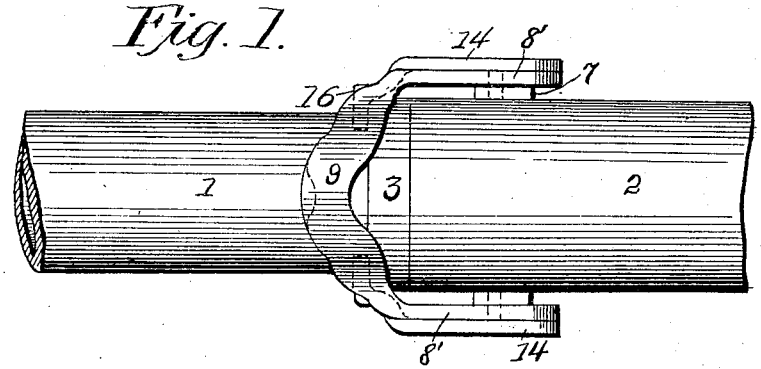
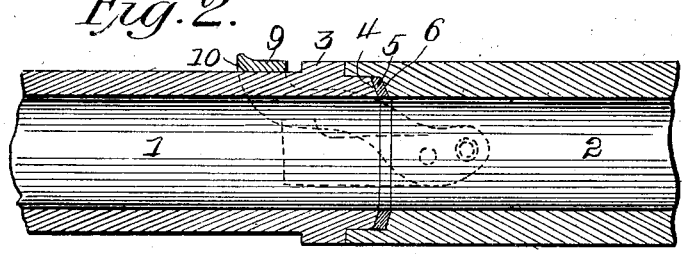
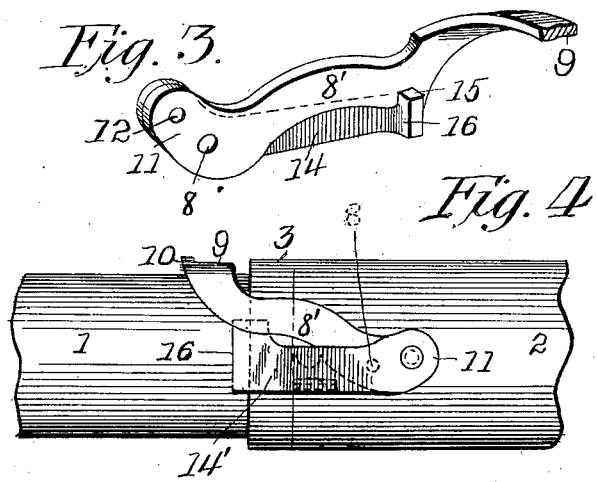
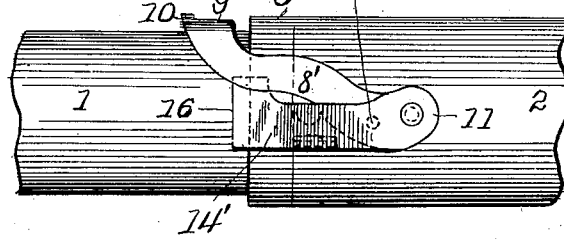
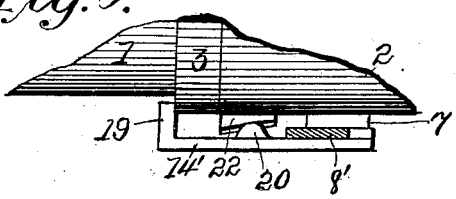
Witnesses,
Inventor,
F. Toerge,
Attorneys.

No. 734,377. Patented July 21, 1903.

UNITED STATES PATENT OFFICE.

FREDERICK TOERGE, OF WILKINSBURG, PENNSYLVANIA.

HOSE-COUPLING.

SPECIFICATION forming part of Letters Patent No. 734,377, dated July 21, 1903.

Application filed March 3, 1903. Serial No. 145,886. (No model.)

*To all whom it may concern:*

Be it known that I, FREDERICK TOERGE, a citizen of the United States of America, residing at Wilkinsburg, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings; and the invention has for one of its main objects to provide novel and effective means for joining the two sections or members of the coupling together without the use of the ordinary threads.

A further object of the invention is to construct a coupling of this type wherein a perfectly smooth bore of equal diameter throughout the length of the coupling is provided, thus affording no impediment to the water in its passage from one section of the hose through the coupling to the other section of the hose.

Other objects of the invention reside in the novel construction of fastening means for securing the two sections or members of the coupling together, the form of joint between the two sections or members, and in other features of construction, as will be hereinafter more specifically described, and then particularly pointed out in the accompanying claim.

In describing the invention in detail reference will be had to the accompanying drawings, forming a part of this application, and wherein like numerals of reference will be employed to designate like parts throughout the different views of the drawings, in which—

Figure 1 is a top plan view of my improved hose-coupling, showing the members or sections in the coupled position. Fig. 2 is a central longitudinal sectional view of the same. Fig. 3 is a detail perspective view of a part of the fastening yoke or device, showing a part of one of the side plates engaged by said yoke. Fig. 4 is a detail side elevation in the coupled position of a modified form of construction. Fig. 5 is a top plan view thereof, partly broken away, showing the yoke in section.

To put my invention into practice, I provide a male member 1 and a female member 2. The male member 1 is constructed near its engaging end with an annular integral collar 3 to form a seat for the engaging end of the female section or member, and at its engaging end the male section is beveled or inclined, as shown at 4, and this inclined or beveled surface seats against a flexible gasket 5, that is placed within the chamfered-out receiving end of the female section or member, the gasket seating against an annular inclined or beveled seat 6, having substantially the same bevel or incline as the beveled surface 4. The female section or member being chamfered or recessed at its receiving end to receive the male section or member, the bore is consequently of the same diameter at the joint as throughout the remainder of the sections or members, and no impediment is offered to the free passage through the coupling of the water. Affixed to opposite side faces of the female member are plates 7, to which are pivotally secured at 8 the side straps or arms of the securing-yoke, embodying in its construction the pair of side straps or arms 8' and the connecting strap or band 9, curved to pass over the coupling and when closed to lie in engagement with the male section, as seen in Fig. 2, the same being notched or turned up at one edge, as seen at 10, in order to permit the catching of the same for lifting to uncouple the members or sections. The side straps or arms are extended some little distance beyond their pivotal point and curved upwardly slightly, and pivotally attached to these extending ends 11, as at 12, are forwardly-extending arms 14, provided at their outer ends with upwardly-extending lugs 15, which engage the inner face of the side straps or arms 8' at the ends of the strap or band 9 when the latter is in the closed position. These arms are held by reason of the shoulders 16 thereof engaging with the annular collar 3 of the male section or member. As the strap or band 9 is raised and thrown back upon the female member the lugs 16 will be forced forwardly away from the collar or flange 3, and as the strap or band is forced down on the male section after the sections have been joined together the lugs 16 of the arms will be drawn into engagement with the flange or collar. When these arms are forced outwardly at their forward ends, these forward ends of the arms will drop by reason of their support at this forward end having been removed; but when the lugs are drawn into engagement with the collar or flange 3 the arms will be held at their free or outer ends, as well as at the rear or pivoted ends thereof, since the arms cannot fall or swing downward at their outer ends so long as the lugs 16 are in engagement with the collar or flange 3.

In Figs. 4 and 5 I also attach the side arms or straps 8' to plates 7, attached to the opposite sides of the female section, the plates 7 carrying journal-pins 17, extending beyond the outer face of the side straps or arms, and having seats in their outer ends to receive the pins carried by the arms 14'. The forward ends 19 of these arms 14' are bent inwardly to engage with the collar or flange, and in order to spread the arms to permit the engagement and disengagement of the sections I provide a boss 20 on the inner face of the arms 14', near the upper edge thereof, and on the outer face of the female section provide bosses 22. As the band or strap 9 is opened and moved back onto the female section the arms 14' are moved forwardly, and the boss or cam 20, engaging with the boss or cam 22, spreads the arms, so as to move the forward ends thereof outwardly, in order to permit the engagement and disengagement of the sections. This spreading or outward movement of the forward ends of the arms is possible by reason of the pivotal joint of ball-and-socket form at the rear or pivoted ends of the arms, this joint permitting the rear ends of the arms moving inward as the forward ends thereof spread. The shoulder on the cam 22 holds up the arms by reason of the cam 20 resting thereon, thus preventing the arms from dropping when the yoke is operated.

While I have herein shown and described the invention in detail in two of its forms as it has been practiced by me, yet it is evident that various changes may be made in the details of construction without departing from the general spirit of the invention.

Having fully described my invention, what I claim as new, and desire to secure by Letters Patent, is—

The combination of the pipe-sections one of which is formed with a collar, of a yoke having its free ends pivoted to the opposite section, and a pair of arms pivoted to the rear portions of the said yoke, and provided at their free ends with inwardly-projecting lugs engaging said collar, said yoke being adapted when in a closed position to engage the inwardly-projecting lugs of the pivoted arms, substantially as described.

In testimony whereof I affix my signature in the presence of two witnesses.

FREDERICK TOERGE.

Witnesses:
A. M. WILSON,
E. E. POTTER.